United States Patent [19]

Rabl et al.

[11] 4,130,107

[45] Dec. 19, 1978

[54] SOLAR CONCENTRATOR WITH RESTRICTED EXIT ANGLES

[75] Inventors: Arnulf Rabl, Downers Grove; Roland Winston, Chicago, both of Ill.

[73] Assignee: The United States of America as represented by the United States Department of Energy, Washington, D.C.

[21] Appl. No.: 850,340

[22] Filed: Nov. 10, 1977

Related U.S. Application Data

[62] Division of Ser. No. 663,590, Mar. 3, 1976, abandoned.

[51] Int. Cl.$^2$ ............................. F24J 3/02; G02B 5/08
[52] U.S. Cl. .............................. 126/270; 136/89 PC; 126/271; 350/293
[58] Field of Search ............... 126/270, 271; 237/1 A; 60/641; 350/199, 200, 288, 293, 294, 299, 310; 136/89 PC

[56] References Cited

U.S. PATENT DOCUMENTS

| | | | |
|---|---|---|---|
| 3,893,754 | 7/1975 | McInally | 350/288 |
| 3,923,381 | 12/1975 | Winston | 126/271 |
| 3,957,031 | 5/1976 | Winston | 350/293 |
| 4,045,246 | 8/1977 | Mlavsky et al. | 126/271 |

FOREIGN PATENT DOCUMENTS 1472267 12/1969 Fed. Rep. of Germany.

OTHER PUBLICATIONS

Light guide arrangement with strong concentrating effects, Optik 25, No. 1, 1967, pp. 31-43, Polke.

Primary Examiner—William F. O'Dea
Assistant Examiner—Larry Jones
Attorney, Agent, or Firm—Dean E. Carlson; Frank H. Jackson; Paul A. Gottlieb

[57] ABSTRACT

A device is provided for the collection and concentration of radiant energy and includes at least one reflective side wall. The wall directs incident radiant energy to the exit aperture thereof or onto the surface of energy absorber positioned at the exit aperture so that the angle of incidence of radiant energy at the exit aperture or on the surface of the energy absorber is restricted to desired values.

5 Claims, 7 Drawing Figures

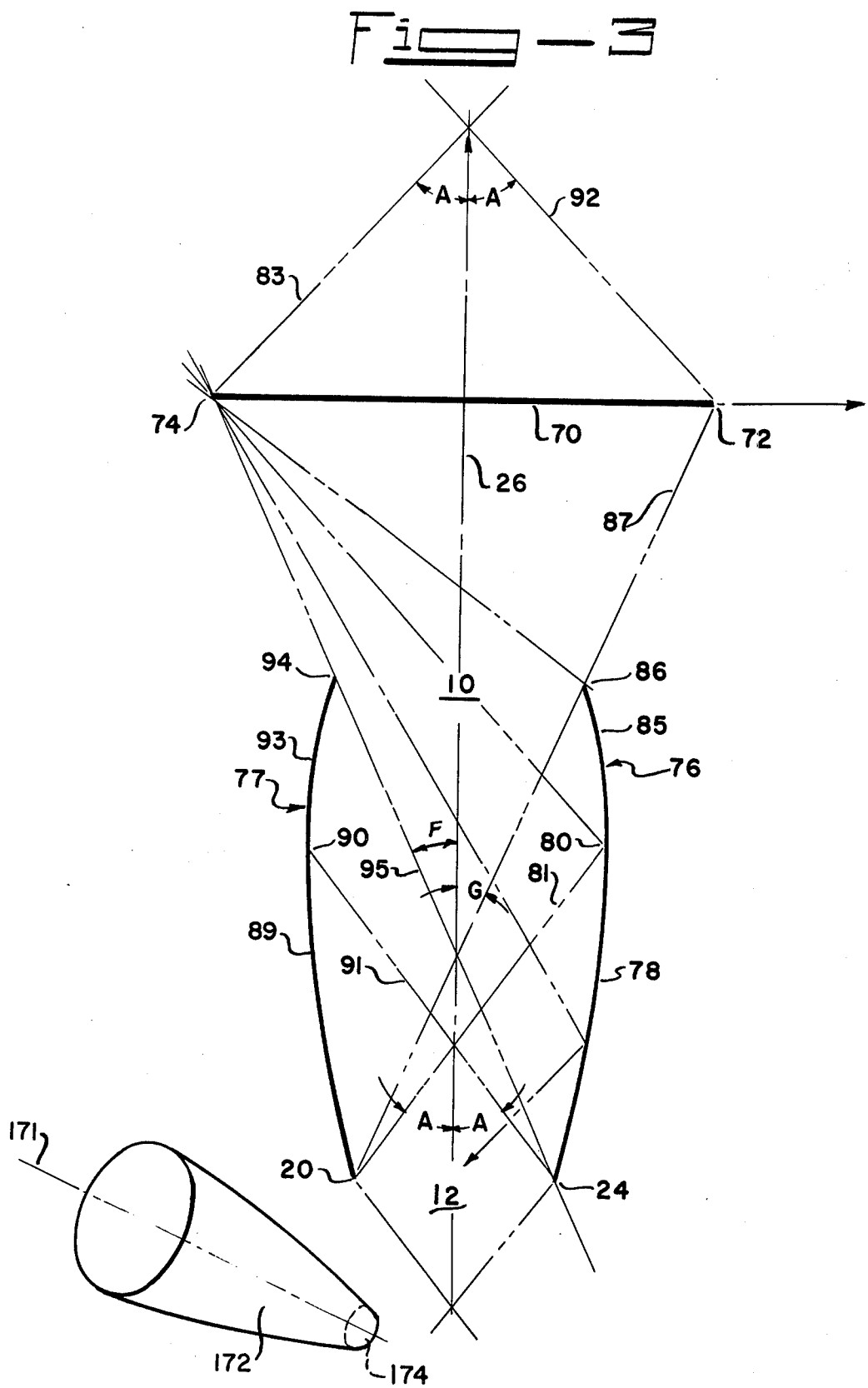

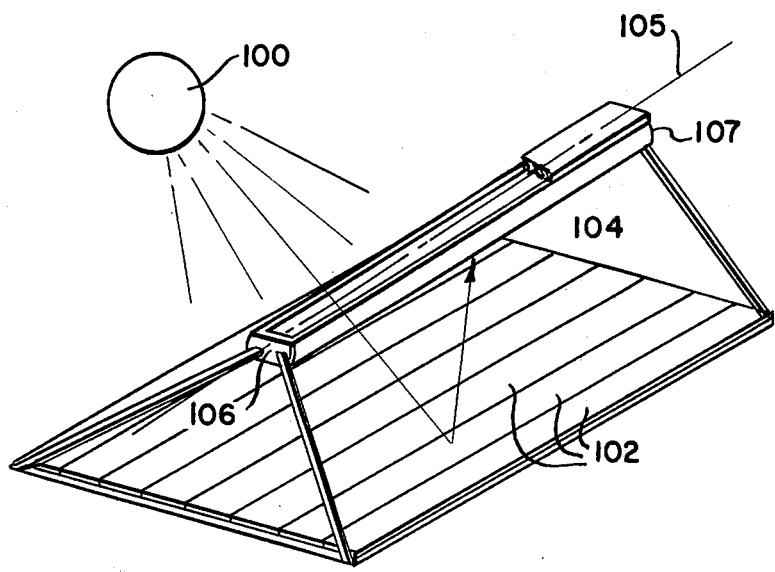
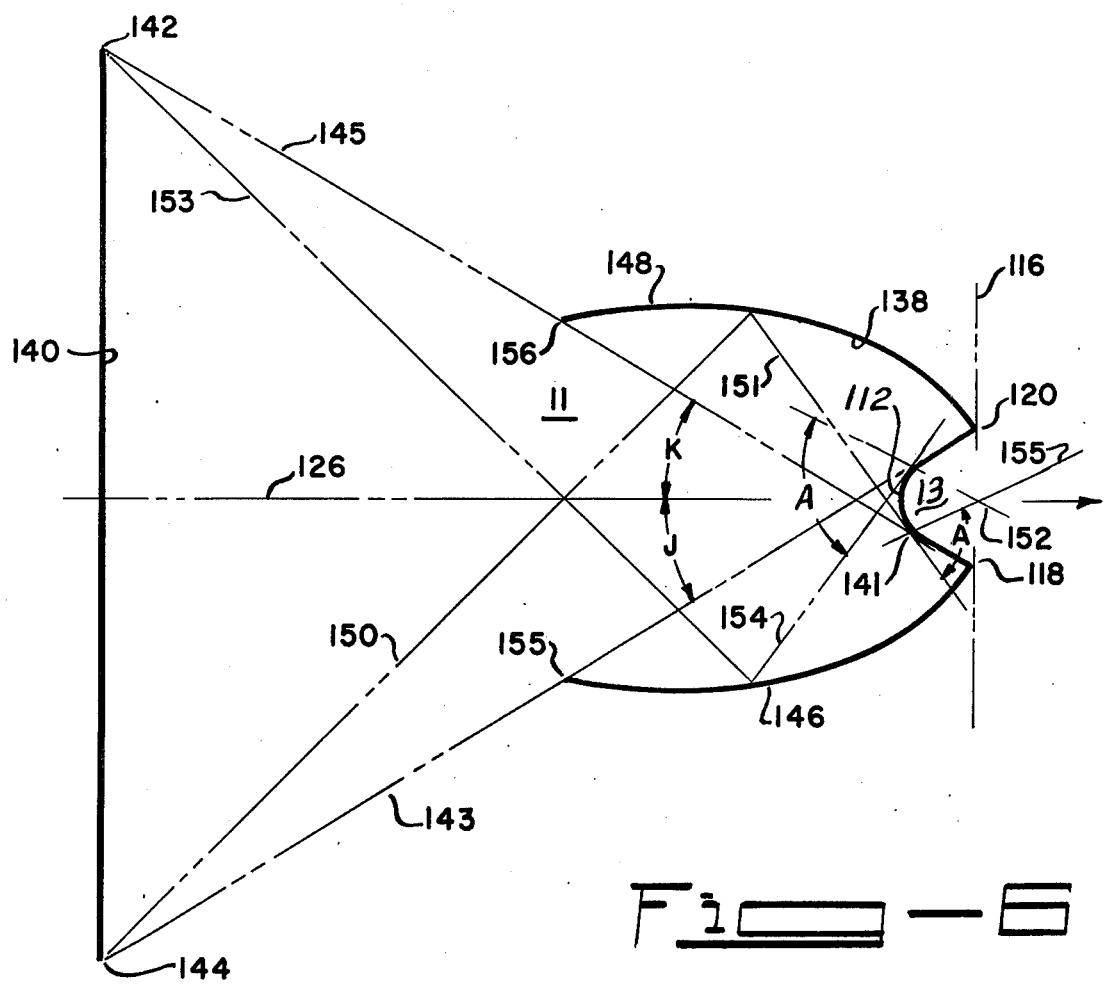

SOLAR CONCENTRATOR WITH RESTRICTED EXIT ANGLES

CONTRACTUAL ORIGIN OF THE INVENTION

The invention described herein was made in the course of, or under, a contract with the U.S. ENERGY RESEARCH AND DEVELOPMENT ADMINISTRATION. This is a division of application Ser. No. 663,590 filed Mar. 3, 1976 now abandoned.

BACKGROUND OF THE INVENTION

The present invention relates generally to the collection of radiant energy from solar sources. A particular type of solar collector is the cylindrical collector, which is formed by extending a transverse cross section longitudinally to form a trough like structure, examples of which are described in a publication, *Solar Energy*, Vol. 16, No. 2, pages 89–95 (1974), in a U.S. Letters Pat. No. 3,923,381 of Winston and in a prior application Ser. No. 581,613 filed May, 29, 1975. Such concentration devices take radiation which strikes an entrance aperture within a given angle of acceptance and concentrates it onto an exit aperture or onto the surface of an energy absorber positioned at the exit aperture with the area of the exit aperture or the surface of the absorber smaller than that of the entrance aperture. In the prior art cylindrical collectors the radiation reaching the exit aperture or the surface of the absorber is totally diffuse, i.e., it is spread out over all angles of incidence at the exit aperture or on the surface of the absorber less than 90°.

In the field of solar energy collection, there are many applications where large angles of radiation, i.e., near 90°, incident at the exit aperture or on the surface of the absorber are undesirable. For example, many energy absorber materials which might be positioned at the exit aperture have poor absorptivity at large angles of incidence. For a selective surface type absorber, such as a sandwich of aluminum oxide, molybdenum and aluminum oxide, absorptivity drops off dramatically at angles of incidence above 60°. In applications where a glass plate is placed over the absorber to reduce convection, radiation incident at large angles is mostly reflected from the glass and does not reach the absorber. Some photovoltaic conversion type absorbers become reflective at large angles of incidence. If a portion of the reflected rays, which would otherwise be incident at the exit aperture or on the absorber at angles greater than desired, are directed within a desired range, increased efficiency in absorption may be obtained.

It is therefore an object of this invention to provide a device for collecting and concentrating solar radiation.

Another object of this invention is to provide a non-imaging, solar energy collection device with restricted angles of incidence of radiation at the exit aperture or on the surface as an energy absorber positioned at the exit aperture.

SUMMARY OF THE INVENTION

A radiant energy concentration and collection device is provided which includes at least one reflective side wall. The wall reflects incident energy onto the exit aperture or onto the surface of an energy receiver. The source of energy may be of finite dimension and finite distance from the collector or of infinite distance from the collector. The contour of the wall is so defined that the angle of incidence of energy at the exit aperture or on the surface of an absorber is limited to desired values.

BRIEF DESCRIPTION OF THE DRAWINGS

FIG. 3 shows a transverse cross section of a radiant energy collection and concentration device with restricted exit angles of incidence at the exit aperture for a energy source of finite dimension and distance from the concentration device;

FIG. 4 shows a trough-shaped structure as utilized as a secondary solar energy collector;

FIGS. 5 and 6 show embodiments of the invention for restricting the angle of incidence on the surface of an energy absorber; and FIG. 7 shows a cone-shaped collector.

DETAILED DESCRIPTION OF THE PREFERRED EMBODIMENT

Figure 1:
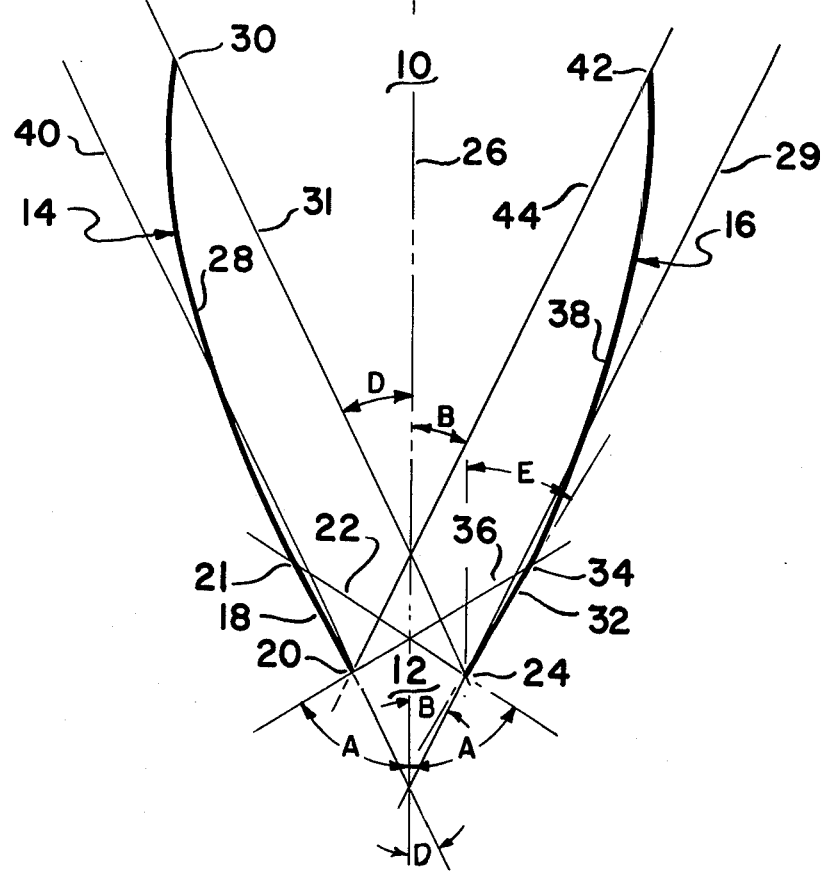
FIG. 1 shows a transverse cross section of a radiant energy collection and concentration device with restricted angles of incidence at the exit aperture for a source of infinite distance from the collector.
Figure 5:
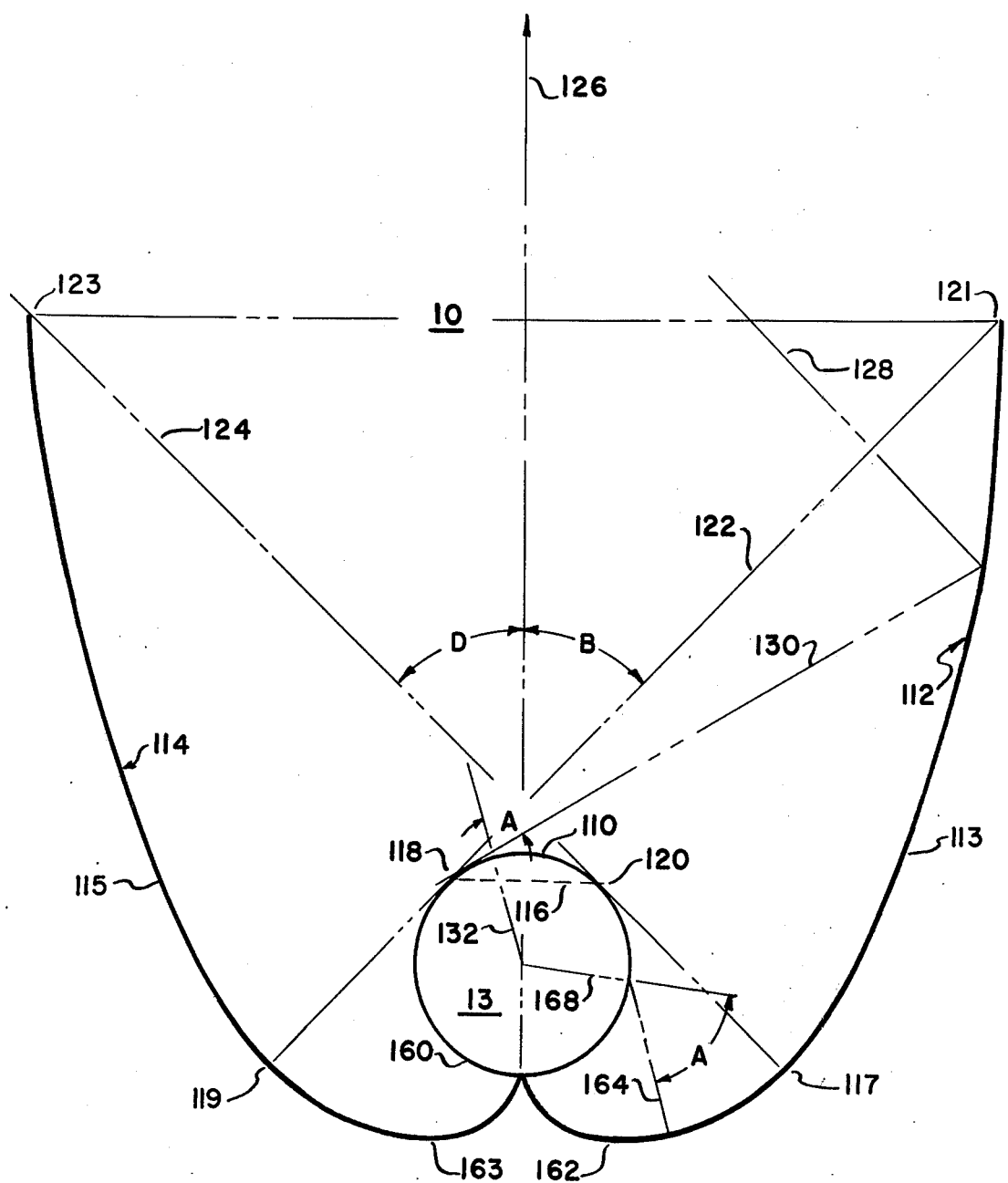

Referring to FIGS. 1, 3, 5 and 6, there are shown the transverse cross sections of various embodiments of cylindrical electromagnetic energy concentration and collection devices utilizing the disclosed invention. These devices may be utilized as cylindrical collectors, in which case, the physical structure of the collector is formed by extending the cross sections shown along an axis perpendicular to the plane of the transverse cross section to form a trough-like structure, as will be described with reference to FIG. 2 and FIG. 4. The embodiments of FIG. 1 and FIG. 3 may also be utilized as conical collectors, in which case the physical structure of the collector is rotated about an axis to form a cone like structure, as will be described with reference to FIG. 7. The function of each device is to concentrate radiant energy, such as energy from the sun, incident within a range of angle at the entrance aperture 10 of each collector to an exit aperture 12 of smaller area than entrance aperture 10 as shown in FIG. 1 and FIG. 3 or onto the surface of an energy absorber 13 as shown in FIG. 5 and FIG. 6. There may be positioned at and coplanar with exit aperture 12 of FIG. 1 and FIG. 3 an energy absorber surface for utilizing the incident energy.

In particular, the present disclosure relates to developing the contour of concentrating side walls, which reflect incident energy to the exit aperture 12 or onto the surface of energy absorber 13 such that the angle of incidence of energy at exit aperture 12 or on the surface of absorber 13 is less than or equal to a given angle A, where A < 90°. For example, consider the collector shown in FIG. 1, having side walls 14 and 16 where the angle of incidence of radiant energy at exit aperture 12 is to be legs than or equal to A. For this embodiment energy will be assumed to be coming from a source of infinite distance from the collector so that all incident rays are assumed parallel. Wall 14 is then comprised of two portions. The first portion 18 has a transverse cross section in the form of a straight line extending from the edge 20 of exit aperture 12, to the intersection point 21 with limit line 22. Limit line 22 is defined as the line which passes through the edge 24 of aperture 12 oppposite edge 20 and which intersects the reference axis 26 on the same side of exit aperture 12 as wall 14 at the angle A. Reference axis 26 is a line perpendicular to and passing through exit aperture 12. The second portion 28 of wall 14 has a transverse cross section in the form of a section of a parabola whose focus is at the edge 24 of aperture 12 and whose axis 29 is a line passing through edge 24 which intersects axis 26 on the opposite side of aperture 12 from wall 14 at an angle B. Second portion 28 of wall 14 terminates at the intersection 30 with shadow line 31. Shadow line 31 is a line which passes through edge 24 and intersects axis 26 on the same side of exit aperture 12 as wall 14 at angle D.

The contour of wall 16 is determined in the same manner as tht of wall 14. Wall 16 is substantially opposite wall 14 and includes a first portion 32 whose transverse cross section is a straight line extending from edge 24 of aperture 12 to point 34 at portion 32's intersection with limit line 36. Limit line 36 is a line through edge 20 intersecting axis 26 at angle A on the same side of aperture 12 a wall 16. The second portion 38 of wall 16 extends from first portion 32 at point 34 and has a transverse cross section in the form of a section of a parabola whose focus is at edge 20 of exit aperture 12 and whose axis 40 is a line through the edge 20 which intersects axis 26 on the opposite side of aperture 12 from wall 14 at an angle D and therefore is parallel to shadow line 31. Second portion 38 of wall 16 terminates at the intersection 42 with shadow line 44. Shadow line 44 is a line which passes through edge 20 and intersects axis 26 on the same side of exit aperture 12 as wall 16 at angle B.

Angles B and D determine the acceptance angle of the device and each is the angle over which radiation received along a line making an angle equal to or less than B and D, respectively with reference axis 26 is directed to exit aperture 12 by walls 14 and 16 respectively assuming an energy source of infinite distance from the collector. The ideal collector for directing all such energy incident on walls 14 and 16 is described in U.S. Pat. No. 3,923,381 of Winston, entitled "Radiant Energy Collection." However, in the collector therein described, a portion of the energy incident at exit aperture 12 due to reflection by the side walls, is incident at angles greater than may be desirable for certain types of absorbers which might be positioned at exit aperture 12. The present disclosure relates to retricting the angle of incidence to being less than or equal to A. The solution shown in FIG. 1 is the ideal one for the case of an infinite source with concentration at an exit aperture 12 or onto a flat planar type absorber positioned at exit aperture 12. This means that in the ideal situation no portion of the absorber extends above the line defining exit aperture 12 between points 20 and 24. Of course, such an absorber which does extend above aperture 12 could be used but ideal collection efficiency with the restricted angles of incidence would not be obtained. An example of a flat planar absorber whould be a photovoltaic cell. Of course, no absorber need be placed exactly at the exit aperture 12. In that case, some sort of an arrangement could be provided for trapping energy exiting the exit aperture 12.

Figure 2:
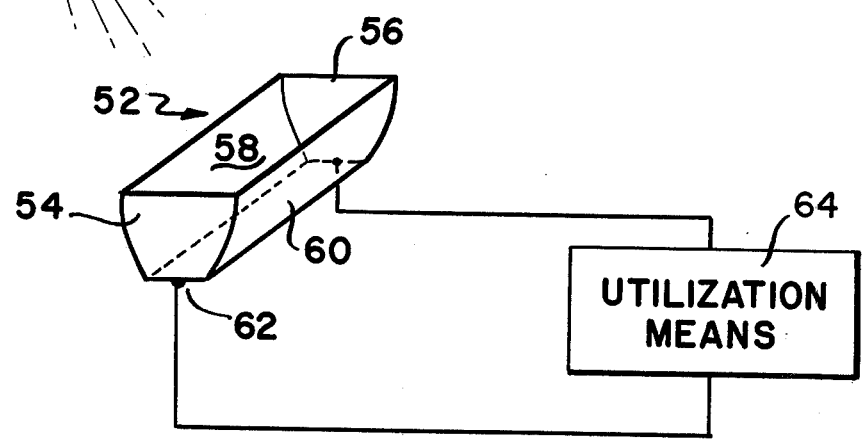
FIG. 2 shows a trough-shaped structure collector as as utilized as a primary solar energy collector.

An example of the practical application of the embodiment of FIG. 1 is shown in FIG. 2. Here the collector is used to collect and concentrate energy from the sun 50. The collector 52 has a transverse cross section which is extended along an axis perpendicular to the cross section shown in FIG. 1 to form a trough-like cylindrical collector. Flat reflective end walls 54 and 56 fully enclose the collector 50. Concentrating walls 58 and 60, whose contour is generated as described with reference to FIG. 1, and side walls 56 and 54 have a relfective material therefrom which reflects substantially all of the solar energy incident thereon from the sun 50, as for example, aluminum or silver. The reflected energy is directed by these reflecting walls onto the exit aperture at which in this embodiment there is positioned a planar energy absorber 62 such as a photovoltaic cell. Connections are provided to the absorber 62 to allow utilization of the enrgy absorbed thereby by utilization means 64.

Referring to FIG. 3, there is shown another embodiment of this invention in which energy will be assumed to be coming from source 70 which is of finite dimension defined by points 72 and 74 and of finite distance from the collector. In such instant, energy cannot be assumed to be of only parallel rays as was the case for the embodiment of FIG. 1. Side walls 76 and 77 are to direct energy incident at entrance aperture 10 to exit aperture 12 such that the angle of incidence at aperture 12 is less than or equal to A. As in FIG. 1, this solution is ideal for energy incident on an exit aperture or on the surface of a flat absorber positioned coplanar with the exit aperture. Wall 76 is comprised of two portions. The first portion 78 has a transverse cross section in the form of a section of a parabola extending from edge 24 of exit aperture 12 to the intersection point 80 with limit line 81. Limit line 81 is defined as the line which passes through the edge 20 of aperture 12 opposite edge 24, and which intersects reference axis 26 on the same side of the exit aperture 12 as wall 76 at the angle A. Parabolic section 78 has as its focus, point 74 of source 83 and as its axis a line 83 passing through point 74 which intersects axis 26 on the opposite side of source 70 from wall 76 at angle A. The apex of parabolic section 78 is also on the opposite side of source 70 from wall 76. Second portion 85 of wall 76 extends from first portion 78 at point 80 to the intersection 86 with shadow line 87. Shadow line 87 is a line between edge points 20 and 72 which crosses axis 26 at angle G. Second portion 85 is a portion of an ellipse whose foci are points 74 and 20.

The contour of wall 77 is determined in the same manner as that of wall 76. Wall 77 is substantially opposite wall 76 and includes a first portion 89 whose transverse cross section is a section of a parabola extending from edge point 20 to point 90 at portion 89's intersection with limit line 91. Limit line 91 is a line through edge point 24 intersecting axis 26 at angle A on the same side of aperture 12 as wall 77. The parabolic section 89 has its focus, point 72 and as its axis a line 92 passing through point 72 which intersects axis 26 on the opposite side of source 70 from wall 77 at angle A. The apex of parabolic section 89 is also on the opposite side of source 70 from wall 77. The second portion 93 of wall 77 extends from first portion 89 at point 90 to the intersection 94 with shadow line 95. Shadow line 95 is a line between edge points 24 and 74 which crosses axis 26 at angle F. Second portion 93 is an elliptical portion with it foci at points 72 and 24. If aperture 12 is symmetrical the acceptance angles G and F will be equal and the collector will have symmetric walls 76 and 77. If aperture 12 is unsymmetrical to source 70, angles G and F will not be equal and wall 76 and 77 will by unsymmetric.

An example of the practical application of the embodiment shown in FIG. 3 is shown in FIG. 4. Here, the collector is ued as a secondary collector. Energy from the sun 100 is initially collected by primary collector 102, which might be an array of mirrors. The energy incident on collector 102 is directed to the secondary collector 104. Collector 104 has a transverse cross section developed with respect to the edge points of primary source 102 and which is generated along axis 105 perpendicular to the cross section to form the trough-like cylindrical collector. Flat reflective end walls 106 and 107 fully enclose the collector.

Another example of the practical application of the embodiments of FIG. 1 and FIG. 3 is shown in FIG. 7. Here the desired contour is rotated about axis 171 to form a cone like structure 172. An energy absorber or trap may be positioned lat the exit aperture 174 of cone 172. Such a cone may be used in well known arrays of cones.

The embodiment of FIG. 1 is the ideal collector with restricted exit angles for the case where energy is assumed incident from an infinite source and is concentrated out the exit aperture or onto the surface of a flat receiver position at the exit aperture. The embodiment of FIG. 3 is the ideal collector with restricted exit angles for the case where the energy is from a source of finite dimension and finite distance from the collector and is to be concentrated out the exit aperture or onto the surface of a flat receiver positioned at the exit aperture. The embodiments shown in FIG. 5 and FIG. 6 are for the case of a nonplanar receiver upon which energy is to be directed with the source of energy being either an infinite source for FIG. 5 or for a finite source for FIG. 6.

Referring to FIG. 5, there is shown a collector wherein the source is assumed at an infinite distance from the collector and energy is to be directed to the surface of an energy receiver 13, such that the angle of incidence of such energy on the surface is preferably less than or equal to the angle A. The receiver 13 may be, for example, a pipe containing fluid, a photovoltaic cell, or any other type of energy receiver responsive to radiant energy. First, we will consider restricting the angle of incidence of rays on the unshaded surface 110 of receiver 13. Energy is to be directed onto surface 110 by the first portions 113 and 115 of side walls 112 and 114 respectively. The unshaded surface 110 upon which energy is to be directed is limited to being convex so that any line tangent to the perimeter of surface 110 does not cross any other point on surface 110. A convex portion also includes within its definition a flat plane absorber positioned along first axis 116 which defines the unshaded convex portion of receiver 13. Thus, the embodiments of FIG. 1 and FIG. 3 are special cases of the description to be given. First axis 116 is the line connecting tangent points 118 and 120. Tangent points 118 and 120 are determined by tangent or shadow lines 122 and 124, respectively. Each tangent line extends to an edge point 118 or 120 intersecting the second axis 126 at the angle of acceptance of the device in the same manner as the shadow lines of FIG. 1. Second axis 126 is a reference axis perpendicular to axis 116 and passes through the unshaded convex portion of receiver 13. For wall 112 the angle of acceptance is D so line 124 intersects axis 126 at angle D. For wall 114 the angle of acceptance is B so tht line 122 intersects axis 126 at angle B. Each tangent line 122 and 124 intersects the tangent point 118 or 120 along surface 110 and is tangent to surface 110 along axis 116. The first portions 113 and 115 of the contour of each wall 112 and 114 respectively is defined by the condition that any radiation incident at the angle of acceptance on the walls are reflected to surface 110 such that the angle of incidence at the surface of the receiver is the angle A.

First portion 113 extends from the intersection 117 of wall 112 with shadow line 124 to no further than point 121 where wall 112 intersects shadow line 122. First portion 115 extends from the intersection 119 of wall 114 with shadow line 122 to no further than point 123 where wall 114 intersects shadow line 124. Consider ray 128 which intersects axis 126 at the angle D. First portion 113 of wall 112 directs the energy incident along ray 128 along path 130 so that the angle of incidence of ray 130 on surface 110 is at the angle A. The angle of incidence is defined as the angle ray 130, makes with a line 132 normal to surface 110 at the point of tangency of ray 130 with surface 110. The same definition applies for the first portion 115 of wall 114 with all rays incident thereon at angle B being directed to be incident on surface 110 at angle A.

When the acceptance angle $2\theta_1$ of the collectors of FIG. 1 and FIG. 5, which is given by the expression $2\theta_1 = B + D$ and is the range of angles of incidence of energy at entrance aperture 10, and the maximum allowable angle of incidence $\theta_2$ at the exit aperture or onto the surface of the absorber are specified, then the collector designs shown in FIG. 1 and FIG. 5 attain the highest possible concentration C permitted by the second law of thermodynamics. C is determined by the expression $$C = (\sin \theta_2)/(\sin \theta_1) \quad (1)$$

The concentrators described in the Winston patent previously referred to and in the publication in *Solar Energy* have $\theta_2 = \pi/2$ and therefore $$C = (1/\sin \theta_1) \quad (2)$$

If the rays incident at the exit aperture or onto the surface of the absorber are to be less than $\pi/2$, then C will be less than the maximum C of equation 2. This is not crucial where the angle of incidence at the exit aperture is restricted due to absorbers which cannot utilize radiation at angles greater than a predetermined value.

In FIG. 1, for maximum C, with $\theta_1 \leq \pi/2$, angle E, which first portions 18 and 32 make with axis 26, is defined by the expression $E = \frac{1}{2}(\theta_2 - \theta_1)$ so that for wall 14, $E = \frac{1}{2}(A - B)$ and for wall 16 $E = \frac{1}{2}(A - D)$. Compared to the ideal concentrator, the $(A - B)$ and $(A - D)$ transformation from ideal concentration allows for the attainment of higher optical efficiencies in solar collectors due to the better absorptivity of certain absorbers at smaller angles. Rays which might otherwise be incident at exit aperture 12 at angles greater than A are now directed at smaller angles allowing absorption by the absorber. In some applications this will be more important than the resulting decrease in concentration, although even for angle A as small as 60°, concentration is still 0.87 of ideal concentration. A similar analysis of concentration applies to all the other embodiments herein shown.

In FIG. 1, or FIG. 5, if $B = D$ then walls 14 and 16 or walls 14 and 16 or walls 112 and 114 will be symmetric about axis 26 or axis 126, respectively and the concentration will be uniform through the year. However, it may be desirable to have a variable concentration, e.g., higher concentration in winter than in summer or visa versa. In that instance $B = D$ and the side walls will not be symmetric. The construction of each wall will be determined by the respective angle of acceptance B or D.

Referring to FIG. 6 there is shown a collector having an absorber 13 which is a finite distance from a source 140. Source 140 is of finite dimension defined by points 142 and 144. As in FIG. 5, we treat first only the unshaded portion of absorber 13 which is limited to being convex according to the previous definition with surface 141 of receiver 13 being used to define the side wall contour. However, the tangent or shadow lines 143 and 145, which define the angle of acceptance, now are extended from an edge point 142 or 144 to the conjugate tangent point 118 or 120 along axis 116 of surface 141 and are tangent to surface 141 along axis 116 at the tangent point in the same manner as was done FIG. 3. Tangent lines 143 and 145 intersect axis 126 at angles J and K respectively. Side walls 146 and 148 direct incident energy onto surface 141. In this case, the contour of walls 146 and 148 are determined by the rule that energy directed from the conjugate edge point of source 140 to a particular wall is then directed by the particular wall to the receiver at the desired restricted angle of incidence. For example, consider ray 150. Ray 150 from edge point 144 is directed by wall 148 along line 151 to be incident on surface 141 at angle A. Angle A is defined as the angle line 151 makes with respect to normal 152 of surface 141 at the point of incidence. Likewise, ray 153 is directed by wall 146 along line 154 to be incident on surface 141 at angle A with respect to normal 155 of surface 141. The contour of each side wall 146 and 148 extends no further than its intersection with tangent lines 143 and 145 at points 155 and 156, respectively.

In FIG. 6, the perimeter of the convex portion of receiver 13 may be extended away from the source of light along tangent lines 143 and 145 as is shown. The tangent lines will remain unchanged no matter how far the extension is made from the initial points of tangency, although the contour of walls 112 and 114 will vary depending upon the actual length of the perimeter of the convex portion of absorber 13. This principle also applies to the convex surface 110 of FIG. 5.

Referring to FIG. 5, let us now consider the shaded surface 160 of absorber 13. This analysis will also apply to any shaded portion of the absorber shown in FIG. 6. The shadow lines or tangent lines 122 and 124 (which could also be tangent lines 143 and 145 of FIG. 6) are defined by the angle of acceptance. In either instance, the definition of the second portions 162 and 163 of side walls 112 and 114 or of second portions (not shown) of side wall 143 and 145 beyond the shadow lines will be the same. In the publication in *Solar Energy* the ideal solution for the shaded portion with unrestricted exit angles is an involute. A solution for restricting to the maximum extent possible the angle of incidence on the surface 160 follows the rule that energy incident on second portions 162 and 163 at angles D and B respectively will be reflected so that it is incident with respect to a normal of the surface of the receiver at the angle A with the result being a modified involute. For example a ray incident on second portion 162 at angle D might be directed along path 164 so that it is incident on surface 160 at angle A with respect to normal 168. In the vicinity of points 118 and 120, where lines 122 and 124 are tangent to absorber 13, the maximum incidence angle must exceed A. However, a maximum restriction can be achieved as shown in FIG. 5.

The embodiment shown in FIGS. 5, and 6 may be utilized either as primary receivers, as shown in FIG. 2, or as secondary receivers, as shown in FIG. 4. The side walls of all receivers are of a material capable of reflecting radiant energy such as by being of silver or aluminum. In practical application the side walls of the collectors may be truncated so that they do not extend all the way to the tangent lines or shadow lines. However, the contours will still follow the definitions herein described.

The side wall contours herein described are determined by the acceptance angle, the definition of the energy source as being finite or infinite, and the contour of a receiver onto which energy is to be directed or the linear contour of an exit aperture to which energy is to be directed. It is the perimeter shape of the receiver 13 of FIG. 5 and FIG. 6 and the linear perimeter of the exit aperture 12 of FIG. 1 and FIG. 3 (which is really a special case of receiver 13) which determine side wall contour. The generic term exit surface may be used to describe the particular cross section perimeter, be it receiver 13 or exit aperture 12, which is used to define side wall contour. The acceptance angle for a source of infinite distance from the collector, i.e. angles B and D of FIG. 1 and FIG. 5 is a predetermined designed value, while the acceptance angle for a source of finite distance from the collector and of finite dimension, i.e. angles F and G of FIG. 3 and angles J and K of FIG. 6, is determined by the line between an edge point of the source and the conjugate tangent point of the exit surface, i.e. lines 87 and 95 of FIG. 3, and lines 143 and 145 of FIG. 6. In either case, the generic term, shadow line is the line through the tangent point which intersects the respective reference axis 26 or 126 on the same side of the exit surface as the side wall at the acceptance angle, i.e. lines 31 and 44 of FIG. 1, lines 87 and 95 of FIG. 3, lines 122 and 124 of FIG. 5, and lines 143 and 145 of FIG. 6. For the source of finite distance from the collector and of finite dimension, the contour of each side wall is uniquely determined by rays generated from the conjugate edge of the source and therefore the angle each of these extremal rays, such as rays 150 and 153 of FIG. 6, make with the reference axis varies. However, as the distance from the source to the collector approaches infinity these extremal rays, such as ray 128 of FIG. 5, become parallel and the angle each makes with reference axis 26 or 126 is essentially the acceptance angle. Therefore, the term extremal ray be used to denote rays from the conjugate edge point of a source of finite distance from the collector or the assumed parallel rays from a source of infinite distance from the collector. In either case, for each point in the side wall contour there will be only one extremal ray from which the side wall contour is determined.

The embodiments of the invention in which an exclusive property or privilege is claimed are defined as follows:

1. A device for concentrating and collecting radiant energy from a source of radiant energy, comprising:
    an energy receiver a portion of whose perimeter is non-linear and has a cross section bounded by and on a first side of a first reference axis and which is convex with respect to said first reference axis, said cross section of said portion having a second axis extending therethrough perpendicular to said first reference axis, the perimeter of the cross section of said portion extending from a first tangent point along said first reference axis to a second tangent point along said first reference axis such that a first shadow line intersects said second axis on the first side of said first reference axis at an angle B and is tangent to the perimeter of the cross section of said portion at said first tangent point and such that a second shadow line intersects said second reference axis on the first side of said first reference axis at an angle D and is tangent to the perimeter of the cross section of said portion at said second tangent point, a first side wall for directing radiant energy being positioned on the same side of said second axis as said first tangent point, said first wall being of such contour that any extremal ray of radiant energy from the source intersecting said second reference axis on said first side of said first reference axis and incident on said first wall is directed along a line which intersects the perimeter of the cross section of said portion at an angle of value A, where A is a particular value less than 90°, said first wall extending from said first shadow line to no further than an intersection with said second shadow line, and a second side wall wall for directing radiant energy being positioned on the same side of said second reference axis as said second tangent point substantially opposite said first side wall, said second side wall being of such contour that any extremal ray of radiant energy from the source intersecting said second reference axis on said first side of said first reference axis and incident on said second side wall is directed along a line which intersects the perimeter of the cross section said portion at said angle A, said second wall extending from said second shadow line to not further than an intersection with said first shadow line, said energy receiver and said first and second side walls extending along a third reference axes perpendicular to said first and second reference axes to form a trough-like structure.

2. The device of claim 1 wherein said first and second side walls terminate at said second and first shadow lines, respectively.

3. The device of claim 1 wherein $B = D$ and wherein said first side wall is a mirror image of the contour of said second side wall.

4. The device of claim 3 wherein said source is a primary solar energy collector and said device is positioned as a secondary collector to concentrate energy directed thereto by said primary collector.

5. The device of claim 1 wherein said receiver includes an additional portion on the opposite side of said first reference axis from said first side and wherein said first and second side walls each include an additional extension below said first and second shadow lines, respectively, said additional extensions of said side walls each being in the form of a modified involute whereby energy incident on said additional extensions of said side walls to the maximum extent possible is directed to be incident on said additional portion of said receiver at an angle no greater than A.

* * * * *